United States Patent [19]

Takeshima

[11] Patent Number: 5,515,113
[45] Date of Patent: May 7, 1996

[54] AUTOMATIC BLACK STRETCH CONTROL FOR A TELEVISION RECEIVER

[75] Inventor: Masahiro Takeshima, Ibaraki, Japan

[73] Assignee: Matsushita Electric Industrial Co., Ltd., Osaka, Japan

[21] Appl. No.: 202,503

[22] Filed: Feb. 28, 1994

[51] Int. Cl.⁶ .............................. H04N 5/57; H04N 5/58
[52] U.S. Cl. .......................... 348/687; 348/602; 348/678; 395/900
[58] Field of Search .................................. 348/602, 603, 348/686, 687, 678–679; 395/900; H04J 5/57, 5/58

[56] References Cited

U.S. PATENT DOCUMENTS

| | | | |
|---|---|---|---|
| 5,084,754 | 1/1992 | Tomitaka | 395/900 |
| 5,191,420 | 3/1993 | Lagoni et al. | 348/687 |

FOREIGN PATENT DOCUMENTS

3-17695  1/1991  Japan ................... H04N 5/58

*Primary Examiner*—James J. Groody
*Assistant Examiner*—Cheryl Cohen
*Attorney, Agent, or Firm*—Willian Brinks Hofer Gilson & Lione

[57] ABSTRACT

An automatically adjustable black stretch control apparatus for a continually adjusting the black stretch of a luminance signal which comprises a black stretch control means for controlling the amount of stretch of the black part of the luminance signal. A luminance signal is input to a plurality of detecting means, each of which detects the percentage of the luminance signal that is within a specified range during a unit period (i.e. a frame). The output of each detecting means is input to one of a plurality of preprocessing means which generates a control index. The output of each preprocessing means is input to one of a plurality of inferring means for creating a synthesized function indicative of the quality of the signal from each of the detecting means. The black stretch control output determining means receives the output of each of the plurality of inferring means and determines the median value of the inferring means signals to determine the amount the black stretch of the luminance signal must be compensated in order to provide an optimum picture. Finally, the black stretch compensation amount control means controls the compensation amount of the black stretch control means according to the compensation amount calculated by the black stretch control output determining means.

6 Claims, 8 Drawing Sheets

AUTOMATIC BLACK STRETCH CONTROL FOR A TELEVISION RECEIVER

FIELD OF THE INVENTION

The present invention relates to an apparatus and method in which black stretch for a luminance signal is automatically controlled according to the rate of the luminance signal with a minimum value, with an average picture level, and within certain ranges of the IRE video scale. Automatically adjusting the black stretch has the effect of increasing the apparent contrast of the picture by lowering the black level and thus improving picture quality.

DESCRIPTION OF THE PRIOR ART

Television receiver screen sizes are becoming larger and larger and the requirements for picture quality are becoming higher. As the requirements for picture quality become higher, the effect of graduation of the luminance signal becomes especially important.

Figure 1:
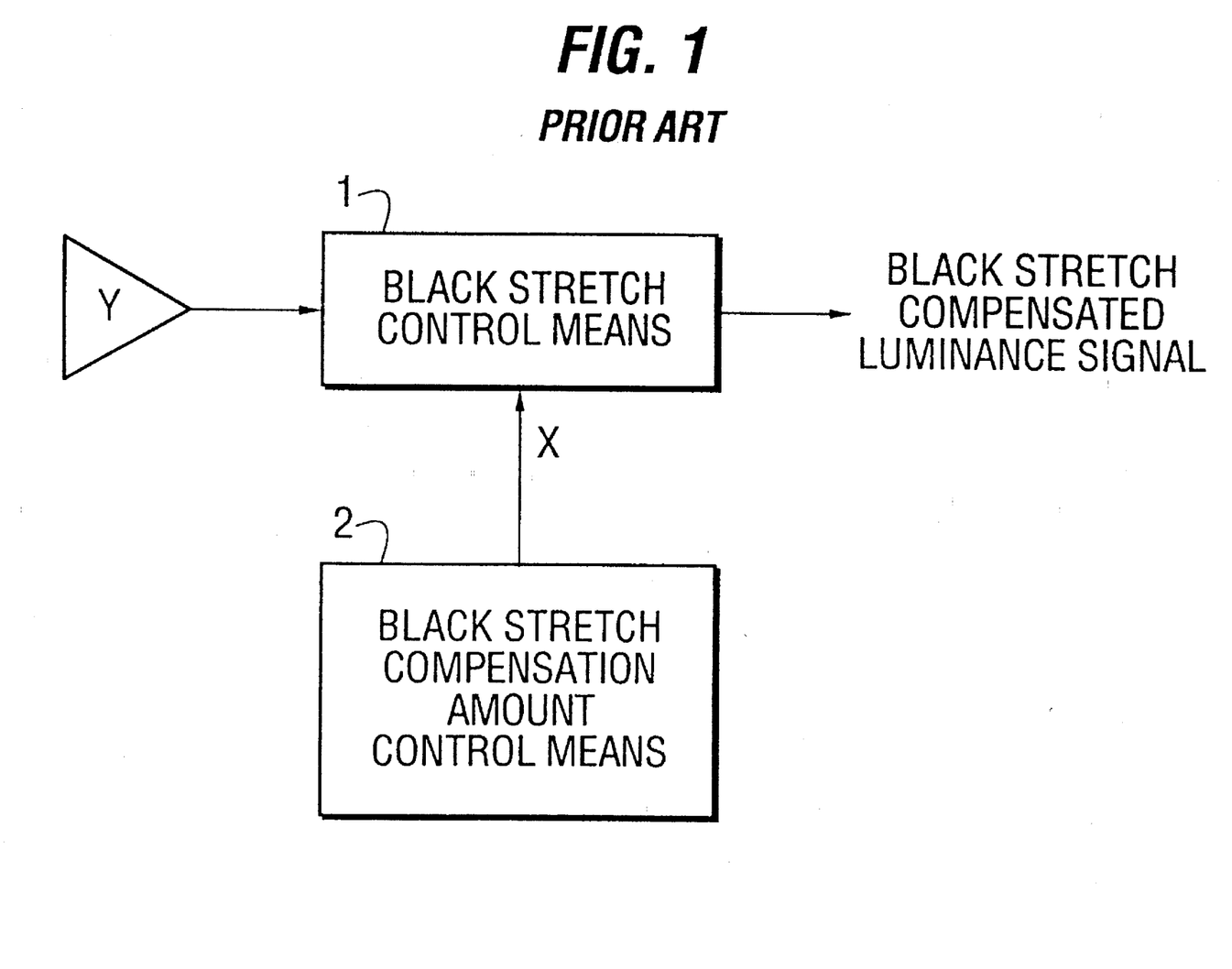
FIG. 1 is a block diagram of a black stretch control apparatus for a luminance signal in accordance with the prior art.

FIG. 1 is a block diagram of a black stretch control apparatus for a luminance signal in accordance with the prior art. A certain fixed value of voltage, current, or impedance is applied to a black stretch compensation amount control means 2. By varying this fixed value with a semi-fixed potentiometer, the black stretch compensation amount control signal X produced by the black stretch control apparatus is controlled. The black stretch control means 1 receives as inputs a luminance signal Y and a black stretch compensation amount control signal X, which is an output of the black stretch compensation amount control means 2. In the black stretch control means 1, the luminance signal Y is black-stretched according to the black stretch compensation amount control signal X and a black stretch compensated luminance signal is produced.

In the above-mentioned configuration, however, when the black stretch of the luminance signal is adjusted at a factory, the value of the black stretch control means 1 is fixed to the value adjusted at the factory. Therefore, because the black stretch value is fixed, television watchers cannot watch a television picture with optimum black stretch compensation for a picture whose content is continuously varying. Thus, the prior art systems described above fails to provide the important advantage of automatically adjusting black stretch control to obtain a high quality picture.

SUMMARY OF THE INVENTION

According to this invention, an automatically adjustable black stretch control apparatus for a luminance signal is provided for continually adjusting the black stretch. The automatically adjustable black stretch control apparatus of this invention comprises a black stretch control means for controlling the amount of stretch of the black part of the luminance signal. A luminance signal is input to a plurality of detecting means, each of which detects the percentage of the luminance signal that is within a specified range of the IRE video scale during a unit period (i.e., a frame). The output of each detecting means is input to one of a plurality of preprocessing means which generates a control value index also called the matching grade value. The output of each preprocessing means is input to one of a plurality of inferring means, which use the mathematical principles of fuzzy logic as outlined by A. Zadeh in 1965, for determining a synthesized fuzzy set based on the control rules and membership functions. An example of use of fuzzy logic to automatically adjust the brightness control for a CRT is disclosed in Japanese Patent Publication No. 3-17695 dated Jan. 25, 1991, and is incorporated herein by reference.

The black stretch control determining means receives the output of each of the plurality of inferring means and determines the median value of the inferring means signals to determine the amount the black stretch must be compensated in order to provide an optimum picture. Finally, the black stretch compensation amount control means controls the compensation amount of the black stretch control means according to the compensation amount calculated by the black stretch control determining means.

Further, a method for automatically adjusting the black stretch of a luminance signal is disclosed. According to the method of this invention, a luminance signal is input to a plurality of detecting means, each of which detects the percentage of the luminance signal that is within a specified range of the IRE video scale during a unit period (i.e., a frame). The output of each detecting means is input to one of a plurality of preprocessing means which generates a control value index. The output of each preprocessing means is input to one of a plurality of inferring means for determining a synthesized fuzzy set based on the control rules and membership functions. The black stretch control determining means receives the output of each of the plurality of inferring means and determines the median value of the inferring means signals to determine the amount the black stretch must be compensated in order to provide an optimum picture. The black stretch compensation amount control means controls the compensation amount of the black stretch control means according to the compensation amount calculated by the black stretch control determining means.

According to the above-mentioned configuration, the signals output from the plurality of detecting means are evaluated and a black stretch control signal is calculated to control the black stretch control means for a luminance signal such that the optimum picture is obtained.

Preferably, the invention includes six detecting means: a S1 detecting means for detecting the percentage of the luminance signal between 0% and 30% of the IRE video scale during a unit period, a S2 detecting means for detecting the percentage of the luminance signal between 30% and 60% of the IRE video scale during the same unit period, a S3 detecting means for detecting the percentage of the luminance signal between 60% and 90% of the IRE video scale during the same unit period, a S4 detecting means for detecting the percentage of the luminance signal over 90% of the IRE video scale during the same unit period, a APL detecting means for detecting the percentage of the luminance signal at the average picture level during the same unit period, and a black level detecting means for detecting the percentage of the luminance signal at the minimum level during the same unit period. The output of each of the detecting means is input to a black stretch control means.

As pointed out in greater detail below the automatic adjustment of the black stretch of the luminance signal provides the important advantage of continuously adjusting the black stretch control to obtain a high quality picture.

The invention itself, together with further objects and attendant advantages, will best be understood by reference to the following detailed description taken in conjunction with the accompanying drawings.

DETAILED DESCRIPTION OF THE INVENTION

Figure 2:
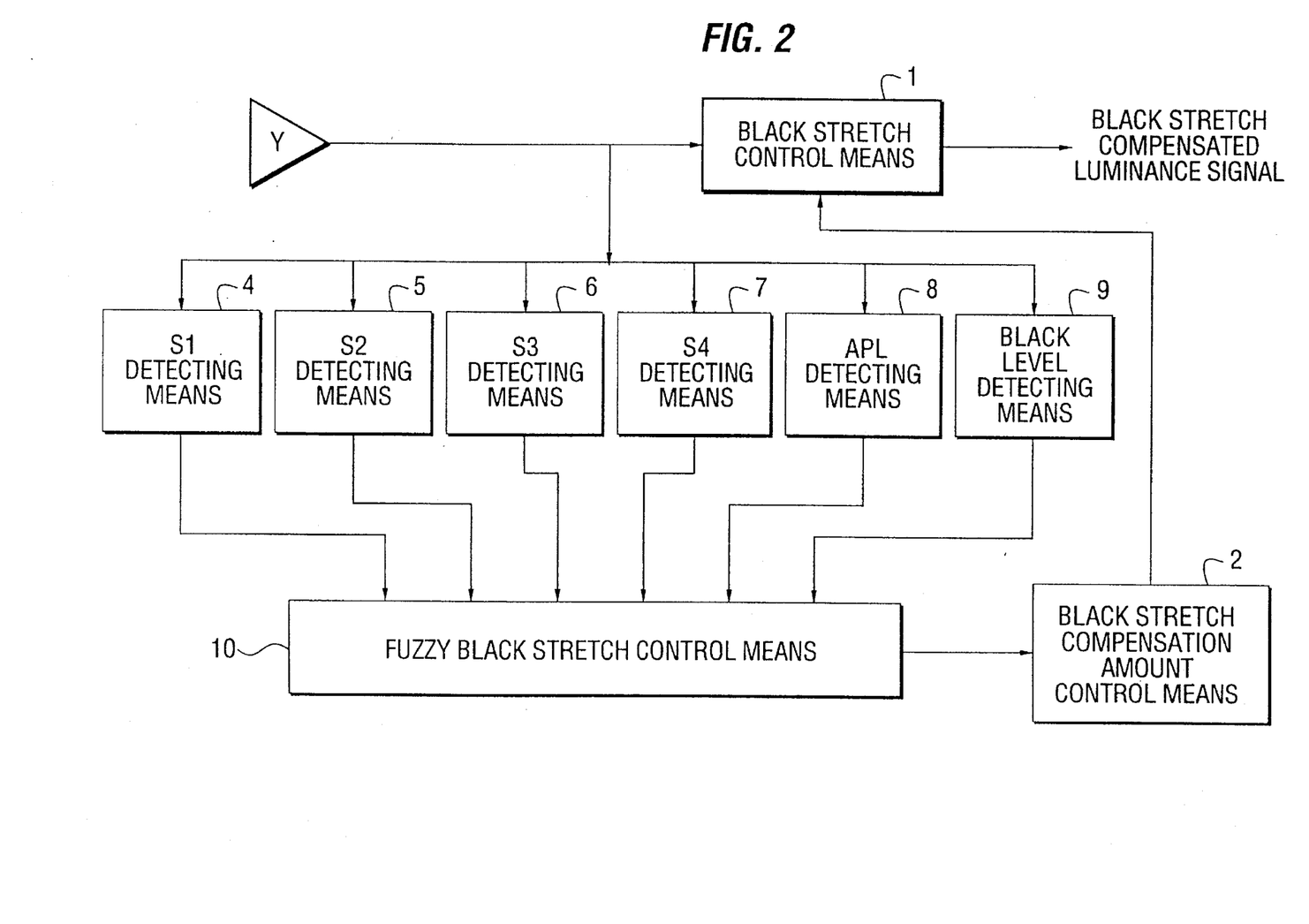
FIG. 2 is a block diagram of an automatic black stretch control apparatus in accordance with the preferred embodiment of this invention.
Figure 3:
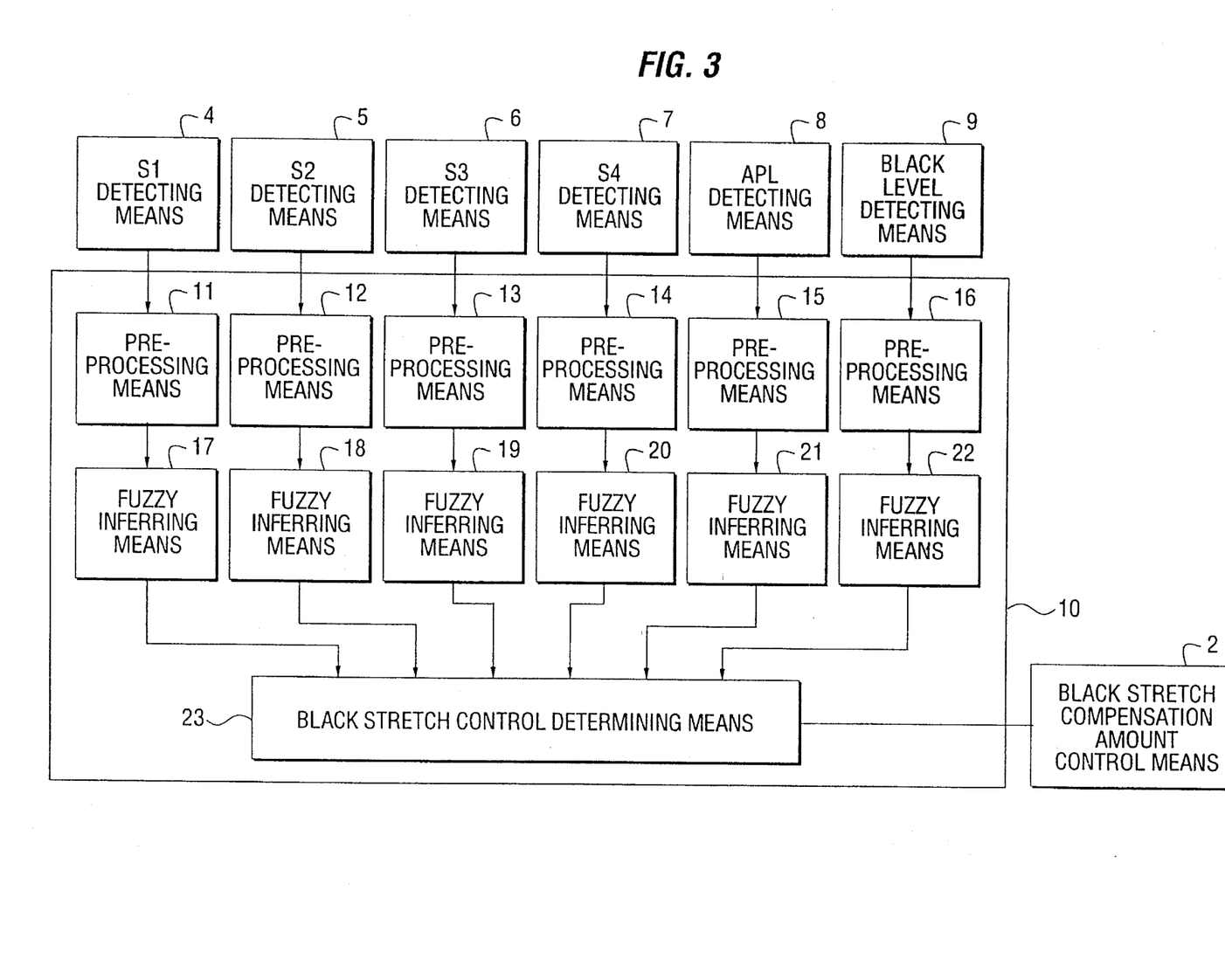
FIG. 3 is a block diagram of a black stretch control means used in an automatic black stretch control apparatus in accordance with the preferred embodiment of this invention.

Turning now to the drawings, FIG. 2 is a block diagram of the automatic black stretch control apparatus in accordance with the preferred embodiment of this invention and FIG. 3 is a block diagram of the fuzzy black stretch control means 10 used in the automatic black stretch control apparatus shown in FIG. 2.

As shown in FIG. 2, a luminance signal Y is input to a black stretch control means 1, as well as to a plurality of detecting means 4, 5, 6, 7, 8, and 9 also referred to as S1 detecting means 4, S2 detecting means 5, S3 detecting means 6, S4 detecting means 7, APL detecting means 8, and black level detecting means 9. Each detecting means detects the percentage of the luminance signal Y that is within certain ranges of the IRE video scale during a unit period, i.e. the brightness level of luminance signal Y during a unit period. The IRE video scale is defined in Standard 50 IRE 23S1, Proc. I.R.E., vol. 38, pp. 551–561, May 1950, herein incorporated by reference.

The percentage of luminance signal Y that is between 0% and 30% during a unit period of the IRE video scale is detected at S1 detecting means 4. Similarly, S2 detecting means 5 determines the percentage of luminance signal Y that is between 30% and 60% of the IRE video scale during the same unit period. During the same unit time period, S3 detecting means 6 determines the percentage of the luminance signal Y that is between 60% and 90% of IRE video scale, and S4 detecting means 7 determines the percentage of the luminance signal Y that is over 90% of the IRE video scale.

The percentage ranges of S1–S4 detecting means 4–7 are selected such that they are at adequate levels according to the performance of black stretch control means 1, i.e. according to the level at which black stretch compensation begins. For example, in the characteristic curve of c of FIG. 10, black stretch is applied for the input level lower than 60% of the IRE video scale and the starting point of black stretch compensation is at the input level of 60% of the IRE video scale. Thus, the percentages ranges of S1–S4 detecting means 4–7 must be adequate so that optimum black stretch compensation is achieved for a luminance signal where black stretch is applied below 60% and which begins black stretch compensation at 60% of the IRE video scale.

In addition to S1–S4 detecting means 4–7, during the same unit period, an APL detecting means 8 detects the average picture level of luminance signal Y, and the black level detecting means 9 detects the minimum value of luminance signal Y. The outputs from the detecting means 4–9 are then input to fuzzy black stretch control means 10.

As shown in FIG. 3, fuzzy black stretch control means 10 includes preprocessing means 11–16 which each respectively receive the outputs of detecting means 4 through 9. Each of the preprocessing means 11–16 generates a control index value, also called a matching grade value, as represented by FIGS. 4(a), 5(a), 6(a), 7(a), 8(a), and 9(a). A matching grade value of 1 means that the signal matches completely, grade value 0 means that the signal does not match at all, and grade value 0.3, for example, means that the signal matches 30% and does not match 70%. The matching grade values produced by preprocessing means 11–16 are input to fuzzy inferring means 17–22, respectively. Each of the fuzzy inferring means 17–22 uses the matching grade value in conjunction with the control rules and membership functions to determine a synthesized fuzzy set.

FIGS. 4–9 show the graphs representing the membership functions used at the preprocessing means 11–16, representing S1, S2, S3, S4, APL and black level, respectively. Tables 1–4, respectively show the control rules expressing the relationship between the luminance signal rate during the unit period, when its level is in the ranges 0% to 30%, 30% to 60%, 60% to 90%, and over 90% of the IRE video scale, and the black stretch compensation amount. Tables 5 and 6 show the control rules expressing the relationship between the luminance signal rate with a average picture level and the black stretch compensation amount value and the black stretch compensation amount, respectively, during the unit period and the black stretch compensation amount.

TABLE 1

| condition part | operation part |
| --- | --- |
| IF S1 rate is very small NB | THEN black stretch compensation is the strongest PB |
| IF S1 rate is a little small | THEN black stretch compensation is strong |

TABLE 1-continued

| condition part | operation part |
|---|---|
| | NS | | PS |
| IF | S1 rate is medium Z | THEN | black stretch compensation is a little strong Z |
| IF | S1 rate is a little big PS | THEN | black stretch compensation is a little weak NS |
| IF | S1 rate is very big PB | THEN | black stretch compensation is nearly zero NB |

TABLE 2

| condition part | operation part |
|---|---|
| IF | S2 rate is very small NB | THEN | black stretch compensation is the strongest PB |
| IF | S2 rate is a little small NS | THEN | black stretch compensation is strong PS |
| IF | S2 rate is medium Z | THEN | black stretch compensation is a little strong Z |
| IF | S2 rate in a little big PS | THEN | black stretch compensation is a little weak NS |
| IF | S2 rate is very big PB | THEN | black stretch compensation is nearly zero NB |

TABLE 3

| condition part | operation part |
|---|---|
| IF | S3 rate is very small NB | THEN | black stretch compensation is nearly zero NB |
| IF | S3 rate is a little small NS | THEN | black stretch compensation is a little weak NS |
| IF | S3 rate is medium Z | THEN | black stretch compensation is a little strong Z |
| IF | S3 rate is a little big PS | THEN | black stretch compensation is strong PS |
| IF | S3 rate is very big PB | THEN | black stretch compensation is the strongest PB |

TABLE 4

| condition part | operation part |
|---|---|
| IF | S4 rate is very small NB | THEN | black stretch compensation is nearly zero NB |
| IF | S4 rate is a little small NS | THEN | black stretch compensation is a little weak NS |
| IF | S4 rate is medium Z | THEN | black stretch compensation is a little strong Z |
| IF | S4 rate in a little big PS | THEN | black stretch compensation is strong PS |
| IF | S4 rate is very big PB | THEN | black stretch compensation is the strongest PB |

TABLE 5

| condition part | operation part |
|---|---|
| IF | APL rate is very big PB | THEN | black stretch compensation is the strongest PB |
| IF | APL rate is a little big PS | THEN | black stretch compensation is strong PS |
| IF | APL rate is medium Z | THEN | black stretch compensation is a little strong Z |
| IF | APL rate is a little small NS | THEN | black stretch compensation is a little weak NS |
| IF | APL rate is very small NB | THEN | black stretch compensation is nearly zero NB |

TABLE 6

| condition part | operation part |
|---|---|
| IF | minimum value rate is very big NB | THEN | black stretch compensation is the strongest PB |
| IF | minimum value rate is a little big PS | THEN | black stretch compensation is strong PS |
| IF | minimum value rate is medium Z | THEN | black stretch compensation is a little strong Z |
| IF | minimum value rate is a little small NS | THEN | black stretch compensation is a little weak NS |
| IF | minimum value rate is very small NB | THEN | black stretch compensation is nearly zero NB |

Figure 11A:
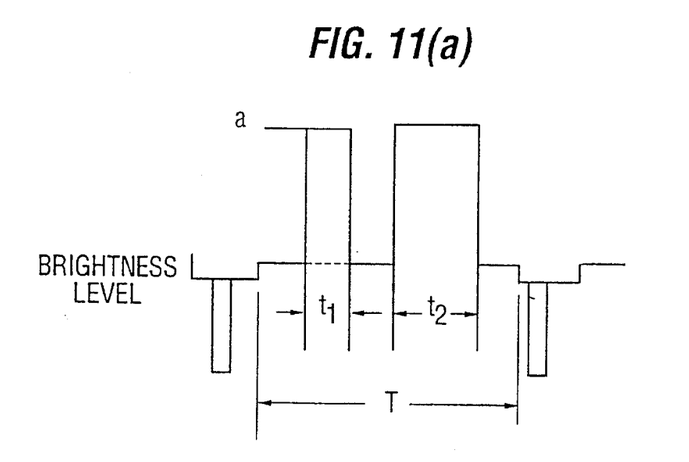
FIG. 11(a) is a graph depicting the brightness level and period of a luminance signal.
Figure 11B:
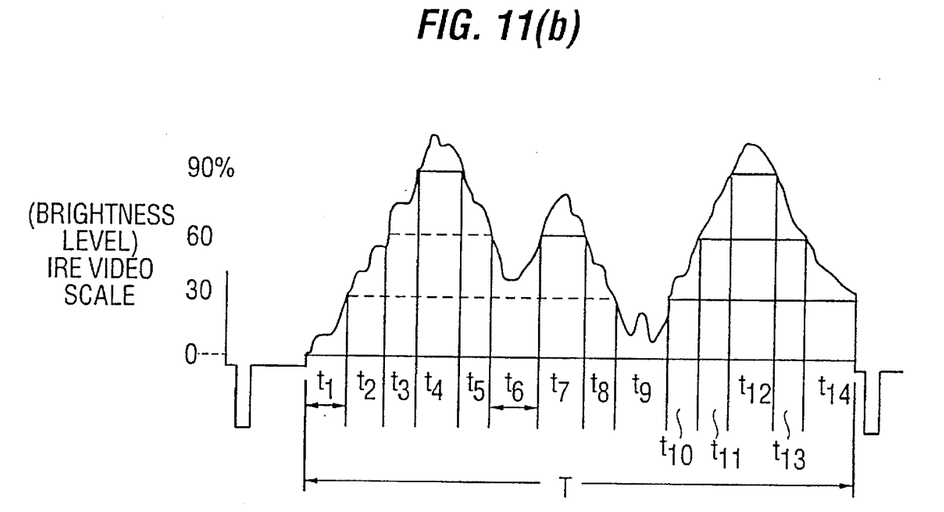
FIG. 11(b) is a graph depicting the brightness level on the IRE video scale for a luminance signal.

As shown in FIGS. 11 (a) and 11 (b), if a signal having a brightness level a appears for a period (t1+t2), the rate of the luminance signal with level a is expressed by (t1+t2)/T, where T is the picture period, i.e. a unit period. For example, if a horizontal scanning period is considered, the unit period T is:

$$T = \text{(horizontal repeating period)} - \text{(horizontal blanking period)}$$
$$= (1/15.75 \text{ khz}) - \{15\% \text{ of horizontal repeating period}\}$$
$$= 54 \text{ microseconds.}$$

Assuming a video signal as shown in FIG. 11(b), the period T1 during which the luminance signal has a brightness level between 0% and 30% is (t1+t9). The period T2 during which the luminance signal has a brightness level between 30% and 60% is (t2+t6+t8+t10+t14). The period T3 during which the luminance signal has a brightness level between 60% and 90% is (t3+t5+t7+t11+t13). The period T4 during which the luminance signal has a brightness level over 90% is (t4+t12). Therefore, the rate of the luminance signal between 0% and 30% is T1/T=(t1+t9)/T. The rate of the luminance signal with a brightness level between 30% and 60% is T2/T=(t2+t6+t8+t10+t14)/T. The rate of the luminance signal with a brightness level between 60% and 90% is T3/T=(t3+t5+t7+t11+t13)/T. The rate of the luminance signal with a brightness level over 90% is T4/T=(t4+t12)/T.

Although the unit period was described above as a horizontal repeating period to simplify the FIG. 11(b) waveform, it is actually (a frame period)–{horizontal blanking periods+ vertical blanking period}.

Therefore, for a whole white picture, the rate of the luminance signal over 90% of the IRE video scale is 100% and the rate of luminance signal between 0% and 30%, the rate of the luminance signal between 30% and 60%, and the rate of the luminance signal between 60% and 90% are all zero.

Merely by way of example, the operation of fuzzy inferring means 17 will be described below with reference to FIG. 4(a), FIG. 4(b), and Table 1. However, each of the fuzzy inferring means 17–22 operate in a similar fashion to determine a synthesized fuzzy set.

Table 1 shows the control rule expressing the relationship between the luminance signal rate during a unit period, in the ranges 0% to 30% of IRE video scale, and the black stretch compensation amount. The meaning of the symbols in Tables 1–6 are as follows:

| NB | Negative Big | very small |
|----|--------------|------------|
| NS | Negative Small | a little small |
| Z | Zero | medium |
| PS | Positive Small | a little big |
| PB | Positive Big | very big. |

Figure 4A:
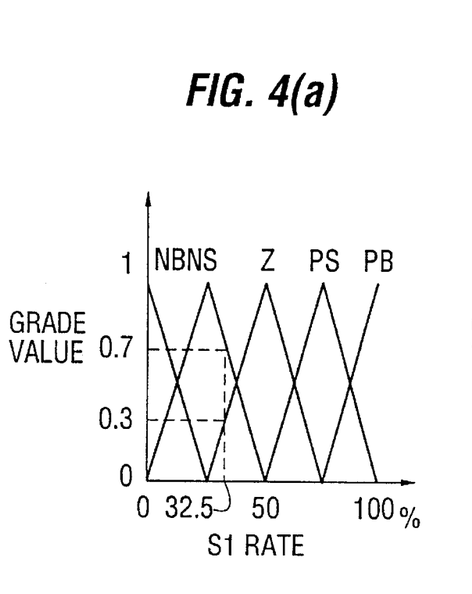
FIGS. 4(a) and 4(b) are graphs showing the membership function expressing the relationship between the luminance signal rate in the range between 0% and 30% of the IRE video scale and the black stretch compensation amount.
Figure 4B:
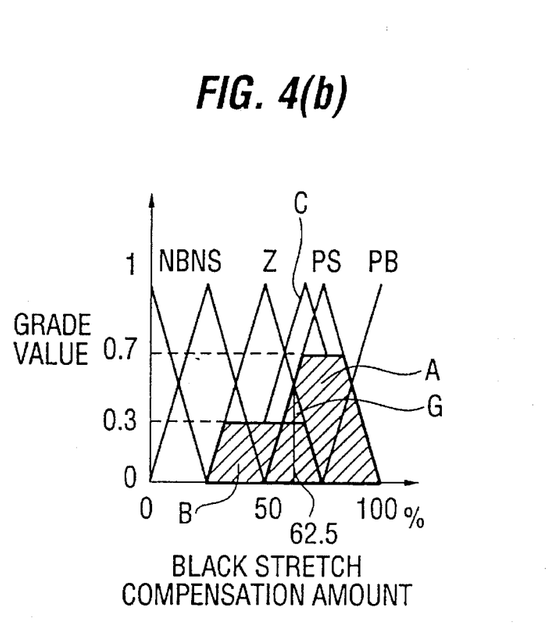
Figure 5A:
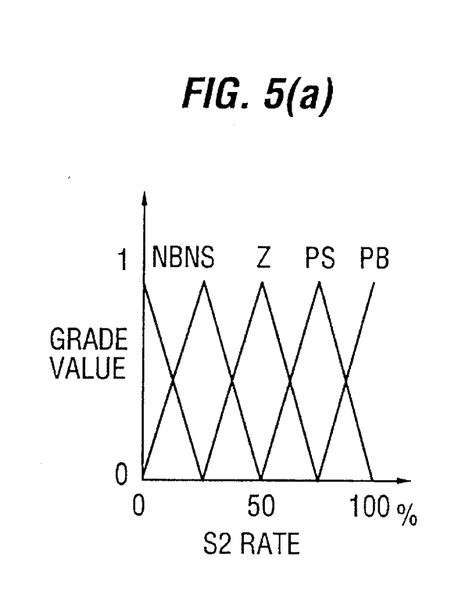
FIGS. 5(a) and 5(b) are graphs showing the membership function expressing the relationship between the luminance signal rate in the range between 30% and 60% of the IRE video scale and the black stretch compensation amount.
Figure 5B:
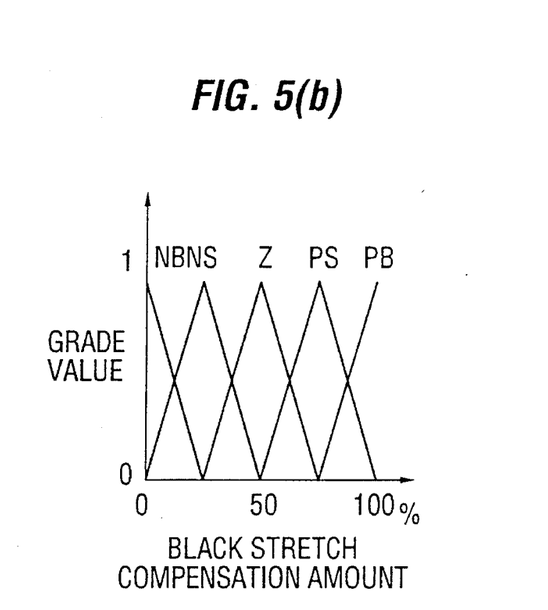
Figure 6A:
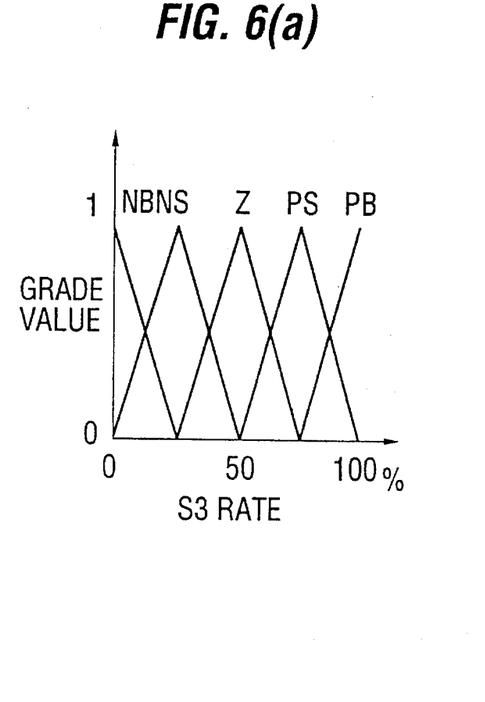
FIGS. 6(a) and 6(b) are graphs showing the membership function expressing the relationship between the luminance signal rate in the range between 60% and 90% of the IRE video scale and the black stretch compensation amount.
Figure 6B:
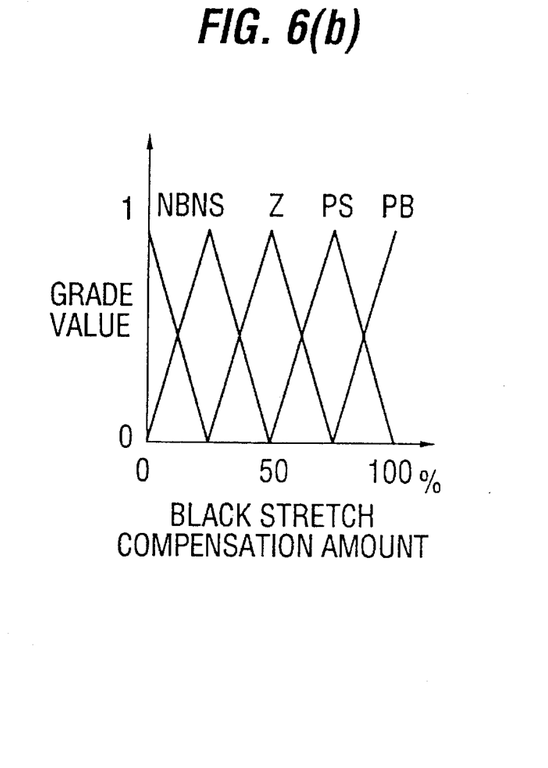
Figure 7A:
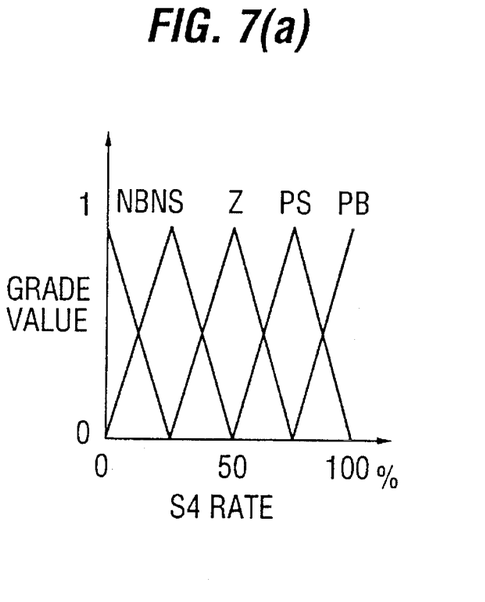
FIGS. 7(a) and 7(b) are graphs showing the membership function expressing the relationship between the luminance signal rate in the range over 90% of the IRE video scale and the black stretch compensation amount.
Figure 7B:
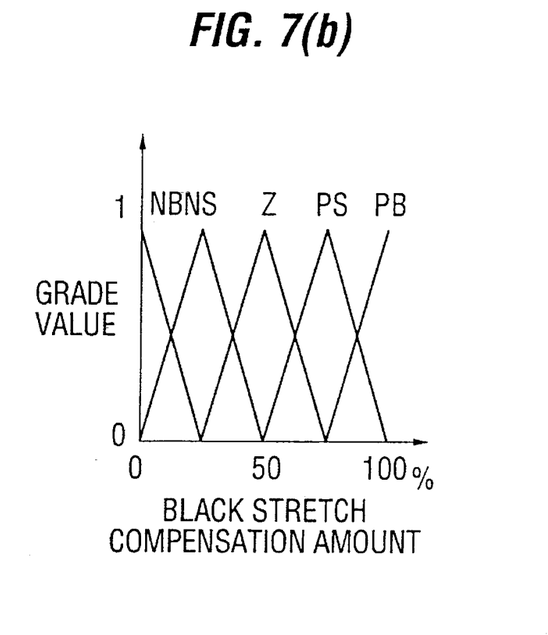
Figure 8A:
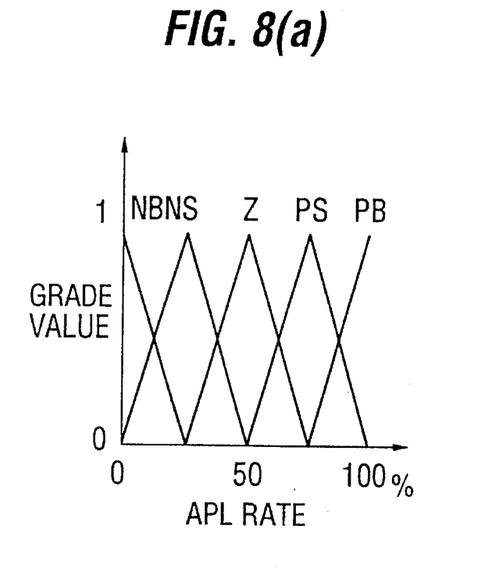
FIGS. 8(a) and 8(b) are graphs showing the membership function expressing the relationship between the luminance signal rate with an average picture level and the black stretch compensation amount.
Figure 8B:
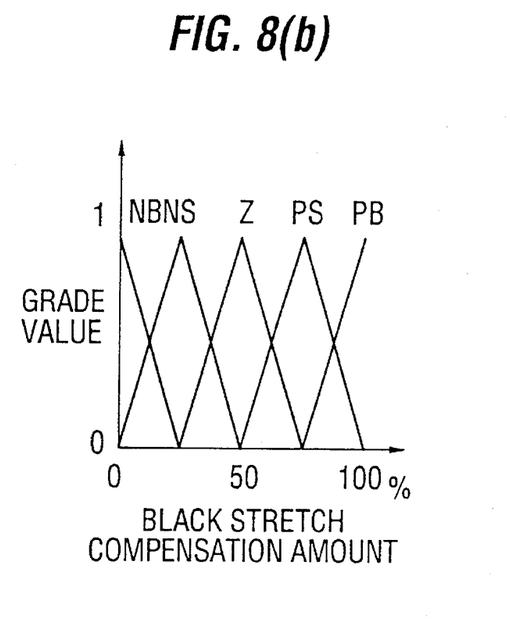
Figure 9A:
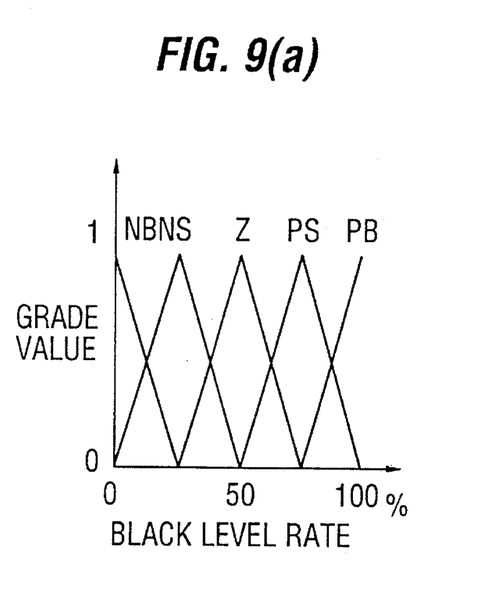
FIGS. 9(a) and 9(b) are graphs showing the membership function expressing the relationship between the luminance signal rate with a minimum level and the black stretch compensation amount.
Figure 9B:
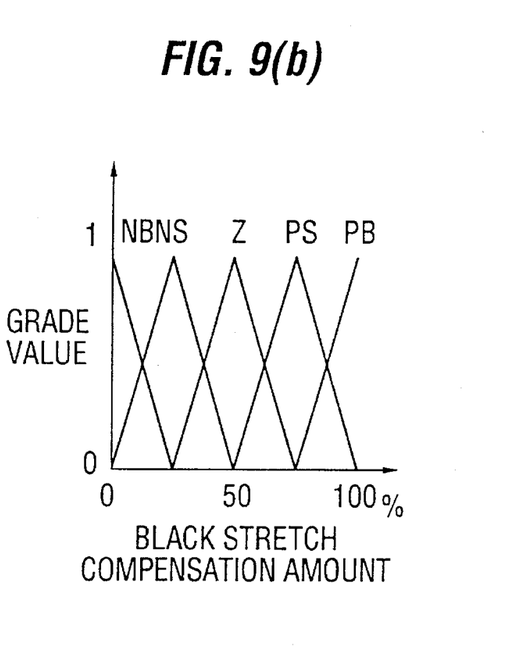

The condition part and the operation part in Table 1 are expressed by the membership functions depicted in the graphs of FIGS. 4(a) and 4(b). Referring to FIG. 4(a), assume a picture in which the percentage of the luminance signal Y which is in the S1 rate range (i.e., between 0% and 30% of IRE video scale) is 32.5%. When the S1 rate is 32.5%, the grade value as determined by preprocessing means 11 is 0.7 for NS and 0.3 for Z. The grade value from preprocessing means 11 is then input to the fuzzy inferring means 17.

Turning now to Table 1, when the condition part (i.e., the S1 rate) is NS then the operation part (i.e., the black stretch compensation) is PS. Therefore, the grade value of PS is cut off at 0.7, as illustrated by the dotted line at 0.7 in FIG. 4(b), based on the NS value of the S1 rate. As shown in FIG. 4(b), the synthesized fuzzy set is graphically represented by trapezoid A marked by the thick line and defined as the area surrounded by the two PS lines and the two horizontal lines of grade value 0.7 and 0. Similarly, if the S1 rate is Z, the black stretch compensation is Z also, according to Table 1. Therefore, the grade value of Z is cut off at 0.3, as illustrated by the dotted line at 0.3 in FIG. 4(b), based on the Z value of the S1 rate.

The trapezoid B also marked by a thick line, defined as the area surrounded by the two Z lines and the two horizontal lines of grade value 0.3 and 0 in FIG. 4(b) represents the synthesized fuzzy set at an S1 rate of 32.5%.

Trapezoid A and Trapezoid B are added vertically to form a heptagon C as shown by the hatched area in FIG. 4(b). Heptagon C represents the maximum value of the synthesized function.

In the preferred embodiment of the invention, fuzzy inferring means 17 uses the center of gravity method to calculate the center of gravity G of the heptagon C. The abscissa of the center of gravity G of heptagon C is 62.5% for an luminance signal Y having a 32.5% S1 rate. Other methods can be used to calculate the center of gravity G of heptagon C, such as, the median method, the height method, or any other method known to those skilled in the art. The center of gravity G is output from fuzzy inferring means 17 to the black stretch control determining means 23.

FIGS. 5–9 show the membership functions for the various rates for each of the various ranges. Tables 2–6 state the control rules for the various rates and the black stretch compensation amount for each of the various ranges.

The respective center of gravity calculations from fuzzy inferring means 17–22 are input to the black stretch control determining means 23 to determines the controlling value (i.e., the value of voltage, current, or impedance) applied to the black stretch compensation amount control means 2 for black level stretching. The black stretch control determining means 23 calculates the final compensation amount for black stretch control by determining the arithmetic mean of the outputs of fuzzy inferring means 17 to 22. The black stretch control determining means 23 outputs that mean to the black stretch compensation amount control means 2 which controls the black stretch compensation amount applied to luminance signal Y in black stretch control means 1. Because this process is continually repeated the black stretch control is automatically kept at an optimum level.

According to the exemplary embodiment of the present invention, optimum black stretch compensation is automatically controlled according to the picture content, by detecting the rate of the luminance signal in each level range, with an average picture level, and with a minimum value during a unit period.

Figure 10:
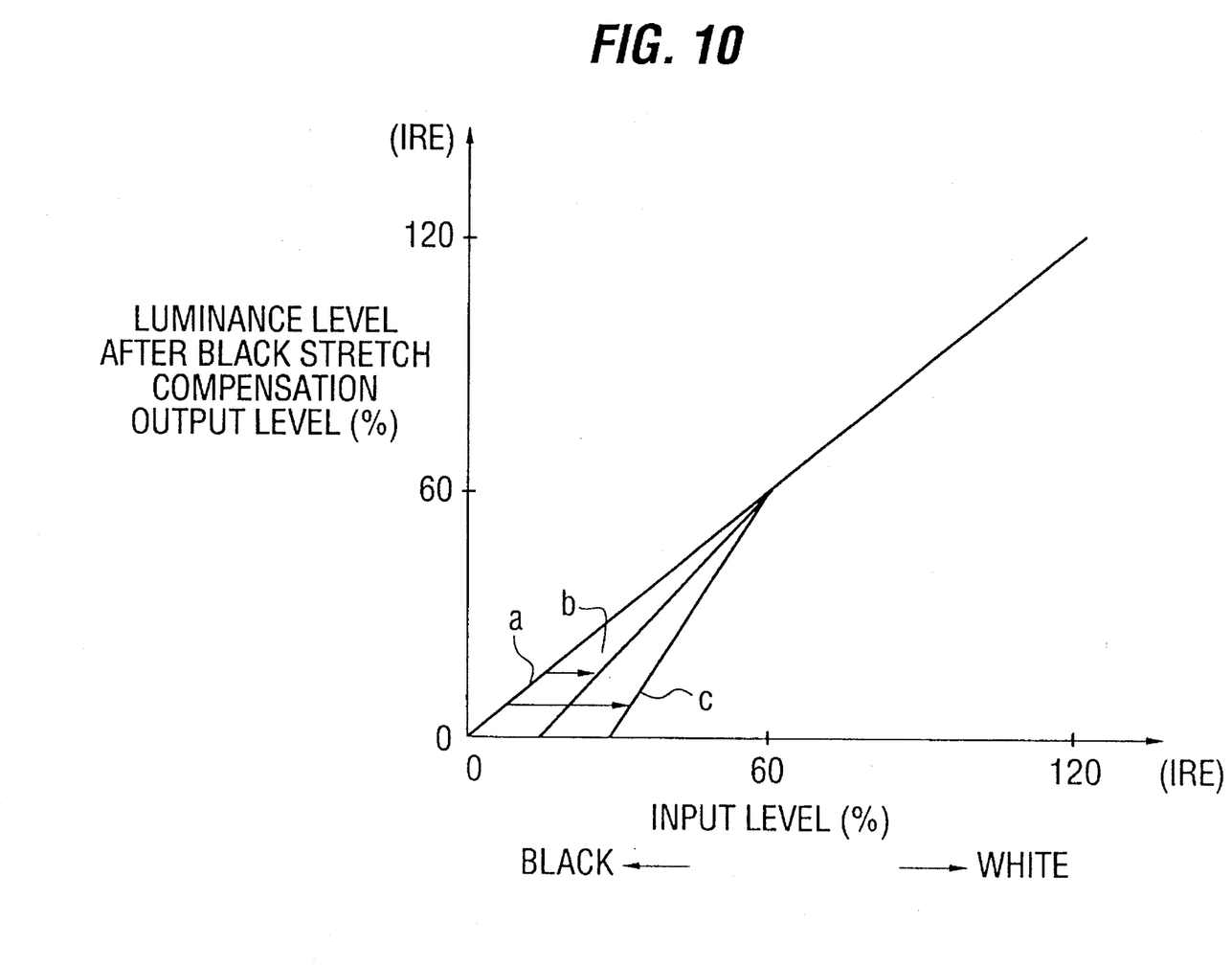
FIG. 10 is a graph showing the characteristics of a black stretch compensated luminance signal according to the preferred embodiment of this invention.

FIG. 10 is a graph showing the characteristics of a luminance signal following black stretch compensation. The curve a represents a characteristic curve without black stretch compensation. Curves b and c represent characteristic curves with black stretch compensation, where curve c is more compensated that curve b. The rate of the luminance signal ranges between $a_n$% and $a_{n+1}$% during a unit period, where $0 \leq a_n < a_{n+1} < a_m \leq 120$ of the IRE video scale. The black stretch characteristic curve a can be moved to the different curves b or c by controlling the compensation amount.

As shown in FIG. 10, if a picture has an input brightness level lower than 30% of the IRE video scale and its input-output characteristics is curve c, the output brightness is zero and the picture is all black and there is no graduation of the picture for the part where the brightness level is lower than 30% of the IRE video scale. If the picture has a brightness level above 30% of the IRE video scale, the curve c is suitable for black stretch because there is no black suppression and the graduation for a comparatively dark part (corresponding to an input level between 30% and 60%) is increased.

If the picture has a brightness level input signal level greater than 15% of the IRE video scale, the curve b is suitable for black stretch because there is no black suppression (because of no signal under 15% of the IRE video scale) and the graduation for a comparatively dark part (corresponding to an input level between 15% and 60%) is increased.

Which characteristic curve b, c, or other curves not shown in FIG. 10 used is automatically chosen by fuzzy black stretch control means 10 according to fuzzy logic.

The principles of this invention can easily be modified by one skilled in the art for use in gamma compensation, white stretch compensation, graduation compensation for a luminance signal, saturation compensation for color difference signal, and other similar signals known to those skilled in the art.

Other variations can be made without parting from the spirit of the invention and the ranges provided are only exemplary of the preferred embodiment of the invention. For example, although the preferred embodiment divides the luminance level of the video signal into four ranges, i.e. between 0% and 30%, 30% and 60%, 60% and 90%, and over 90% of the IRE video scale, the range and the number of divisions are not restricted to these ranges and divisions and can be any combination of ranges and divisions desired. In the preferred embodiment of the invention, the percentage ranges of detecting means 4–7 are selected such that they are at an adequate level according to the performance of the black stretch control means 1.

Furthermore, one or any number of groups consisting of detecting means, preprocessing means, and inferring means may be used instead of six groups as described above.

Of course, it should be understood, that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. An automatic black stretch control apparatus for a luminance signal comprising:

a black stretch control means for controlling the black stretch of said luminance signal;

a detecting means for detecting a rate of said luminance signal in a specified range during a unit period and for producing an output indicative of said rate;

a preprocessing means for generating a control index for evaluating the output of said detecting means as a fuzzy set;

an inferring means for producing a synthesized function based on said control index;

a black stretch control output determining means for determining a black stretch control value based on said synthesized function;

a black stretch compensation amount control means for controlling said black stretch control means according to said control value of said black stretch control output determining means;

an APL detecting means for detecting the rate of said luminance signal with an average picture level during a unit period and for producing an output indicative of said rate;

an APL preprocessing means for generating an APL control index for evaluating the output of said APL detecting means; and an APL inferring means for producing an APL synthesized function based on said APL control index, said black stretch control output determining means receiving said APL synthesized function and determining a mean of said synthesized function and said APL synthesized function.

2. An automatic black stretch control apparatus for a luminance signal comprising:

a black stretch control means for controlling the black stretch of said luminance signal;

a detecting means for detecting a rate of said luminance signal in a specified range during a unit period and for producing an output indicative of said rate;

a preprocessing means for generating a control index for evaluating the output of said detecting means as a fuzzy set;

an inferring means for producing a synthesized function based on said control index;

a black stretch control output determining means for determining a black stretch control value based on said synthesized function;

a black stretch compensation amount control means for controlling said black stretch control means according to said control value of said black stretch control output determining means;

a black level detecting means for detecting a rate of said luminance signal with an minimum level during a unit period;

a black level preprocessing means for generating a black level control index for evaluating the output of said black level detecting means; and a black level inferring means for producing a black level synthesized function based on said black level control index, said black stretch control output determining means receiving said black level synthesized function and determining a mean of said synthesized function and said black level synthesized function.

3. An automatic black stretch control apparatus for a luminance signal comprising:

a black stretch control means for controlling the black stretch for said luminance signal;

a plurality of detecting means for detecting a rate of said luminance signal in a specified range of an IRE video scale between $a_n\%$ and $a_{n+1}\%$ during a unit period, where $0 \leq a_n < a_{n+1} < a_m \leq 120$;

an APL detecting means for detecting a rate of said luminance signal with an average picture level during said unit period and producing an output indicative of said APL rate;

a black level detecting means for detecting a rate of said luminance signal with an minimum level during said unit period and for producing an output indicative of said black level rate;

a plurality of preprocessing means for generating preprocessing control indexes for evaluating each output of said plurality of detecting means;

an APL preprocessing means for generating an APL control index for evaluating the output of said APL detecting means;

a black level preprocessing means for generating a black level control index for evaluating the output of said black level detecting means;

a plurality of inferring means for producing a synthesized function based on said preprocessing control indexes;

an APL inferring means for producing an APL synthesized function based on said APL control index;

a black level inferring means for producing a black level synthesized function based on said black level control index;

a black stretch control output determining means for determining a mean of said preprocessing, APL and black level synthesized functions;

a black stretch compensation amount control means for controlling the compensation amount of said black stretch control means according to the mean determined by said black stretch control output determining means.

4. An automatic black stretch control apparatus for a luminance signal comprising:

a black stretch control for controlling the black stretch of said luminance signal;

a detector for detecting a rate of said luminance signal in a specified range during a unit period and for producing an output indicative of said rate;

a preprocessor for generating a control index for evaluating the output of said detector as a fuzzy set;

an inferring for producing a synthesized function based on said control index;

a black stretch control output determinor for determining a black stretch control value based on said synthesized function;

a black stretch compensation amount controller for controlling said black stretch control according to said control value of said black stretch control output determinor;

an APL detector for detecting the rate of said luminance signal with an average picture level during a unit period and for producing an output indicative of said rate;

an APL preprocessor for generating an APL control index for evaluating the output of said APL detector; and an APL inferror for producing an APL synthesized function based on said APL control index, said black stretch control output determinor receiving said APL synthesized function and determining a mean of said preprocessor synthesized function and said APL synthesized function.

5. An automatic black stretch control apparatus for a luminance signal comprising:

a black stretch control for controlling the black stretch of said luminance signal;

a detector for detecting a rate of said luminance signal in a specified range during a unit period and for producing an output indicative of said rate;

a preprocessor for generating a control index for evaluating the output of said detector as a fuzzy set;

an inferror for producing a synthesized function based on said control index;

a black stretch control output determinor for determining a black stretch control value based on said synthesized function;

a black stretch compensation amount controller for controlling said black stretch control according to said control value of said black stretch control output determinor;

a black level detector for detecting a rate of said luminance signal with a minimum level during a unit period;

a black level preprocessor for generating a black level control index for evaluating the output of said black level detecting means;

a black level inferror for producing a black level synthesized function based on said black level control index, said black stretch control output determining means receiving said black level synthesized function and determining a mean of said preprocessor synthesized function and said black level synthesized function.

6. A method for automatically controlling black stretch for a luminance signal comprising the steps of:

detecting a rate of said luminance signal in a specified range during a unit period;

generating a control index indicative of said rate;

producing a synthesized function based on said control index, wherein said step of producing a synthesized function includes:
determining a grade value of said luminance signal based on a membership function;
determining a synthesized fuzzy set based on said grade value;
adding said synthesized fuzzy set; and
calculating the center of gravity of said added fuzzy set;

determining a black stretch control value based on said synthesized function; and adjusting black stretch of said luminance signal according to said black stretch control value.

* * * * *

UNITED STATES PATENT AND TRADEMARK OFFICE
CERTIFICATE OF CORRECTION

PATENT NO. : 5,515,113
DATED : May 7, 1996
INVENTOR(S) : Masahiro Takeshima

It is certified that error appears in the above-identified patent and that said Letters Patent is hereby corrected as shown below:

On the title page: Item [54] and Column 1, line 3, "AUTOMATIC BLACK STRETCH CONTROL FOR A TELEVISION RECEIVER" should read --AUTOMATIC BLACK STRETCH FUZZY CONTROL FOR A TELEVISION RECEIVER--.

Column 4, Line 56: "amount" should read --amount, and a minimum--.

Column 10, Line 63: "control" should read --controller--.

Column 11, Line 3: "inferring" should read --inferror--.

Column 11, Line 25: "control" should read --controller--.

Signed and Sealed this

Eighth Day of December, 1998

Attest:

BRUCE LEHMAN

*Attesting Officer*    *Commissioner of Patents and Trademarks*